US007214258B2

(12) United States Patent
Abidi et al.

(10) Patent No.: US 7,214,258 B2
(45) Date of Patent: May 8, 2007

(54) EVAPORATED FUEL PROCESSING DEVICE

(75) Inventors: Mostafa Abidi, Luxembourg (LU); Remi B Loevenbruck, Athus (BE); Karine Pelletier, Longwy (FR); Thomas Leonard, Bascharage (LU); Ennio De Biasio, Bascharage (LU)

(73) Assignee: Delphi Technologies, Inc., Troy, MI (US)

( * ) Notice: Subject to any disclaimer, the term of this patent is extended or adjusted under 35 U.S.C. 154(b) by 300 days.

(21) Appl. No.: 10/897,376

(22) Filed: Jul. 22, 2004
(Under 37 CFR 1.47)

(65) Prior Publication Data

US 2005/0022672 A1 Feb. 3, 2005

(30) Foreign Application Priority Data

Jul. 30, 2003 (EP) .................................. 03102370

(51) Int. Cl.
*B01D 53/04* (2006.01)
*F02M 33/02* (2006.01)

(52) U.S. Cl. ........................... 96/131; 96/147; 123/519

(58) Field of Classification Search .................. 96/121, 96/131, 147, 152; 123/518, 519, 520, 521
See application file for complete search history.

(56) References Cited

U.S. PATENT DOCUMENTS 5,456,237 A * 10/1995 Yamazaki et al. .......... 123/520
5,460,136 A * 10/1995 Yamazaki et al. .......... 123/519
5,564,398 A * 10/1996 Maeda et al. ............... 123/520
5,743,943 A * 4/1998 Maeda et al. ................. 96/126
5,861,050 A * 1/1999 Pittel et al. .................... 95/115
6,503,301 B2 * 1/2003 Uchino et al. ................ 96/132
7,051,717 B2 * 5/2006 Meiller et al. ............. 123/518
2001/0047723 A1 * 12/2001 Miura et al. .................. 96/121
2004/0261773 A1 * 12/2004 Abidi et al. ................ 123/519
2005/0172938 A1 * 8/2005 Uchino et al. .............. 123/519

FOREIGN PATENT DOCUMENTS

JP 07-208276 A * 8/1995

* cited by examiner

*Primary Examiner*—Frank M. Lawrence
(74) *Attorney, Agent, or Firm*—Paul L. Marshall

(57) ABSTRACT

An evaporated fuel processing device (10), in particular for an internal combustion engine of an automotive vehicle, comprises a tank port (12) and an atmospheric port (22); a first adsorbent chamber (14) between the tank port (12) and the atmospheric port (22); and a second adsorbent chamber (18) between the first adsorbent chamber (14) and the atmospheric port (22), the first and second adsorbent chambers (14, 18) being filled with an adsorbent material (16). According to an important aspect of the invention, at least two elongate flow passages (26, 26') are arranged in parallel between the first adsorbent chamber (14) and the second adsorbent chamber (18).

11 Claims, 1 Drawing Sheet

EVAPORATED FUEL PROCESSING DEVICE

FIELD OF THE INVENTION

The present invention generally relates to an evaporated fuel processing device, in particular for an internal combustion engine of an automotive vehicle, comprising an evaporative canister.

BACKGROUND OF THE INVENTION

There are three main sources of polluting gasses from an internal combustion engine: engine exhaust, crankcase, fuel supply systems. In the fuel tank, the hydrocarbons that are continually evaporating from the fuel constitute a significant contributing factor to air pollution.

To control the air pollution resulting from these emissions, governments establish quality standards and perform inspections to ensure that standards are met. Standards have become progressively more stringent, and the equipment necessary to meet them has become more complex. Emissions from the fuel tank are reduced by an evaporated fuel processing device, the heart of which is an evaporative canister of activated carbon capable of holding fuel vapour. In operation, the fuel tank vapours flow from the fuel tank to a liquid-vapour separator that returns the raw fuel to the tank and channels the fuel vapour to the canister. The evaporative canister acts as a storehouse; when the engine is running, the vapours are purged from the evaporative canister through the purge port into the combustion chamber, where they are burnt.

An evaporative canister is e.g. known from US patent application US-A-2002/0007826. The evaporative canister is a typically vertical-placed type integrated canister connected to a fuel tank. Evaporated fuel from the fuel tank is led to the evaporative canister via an evaporated fuel passage and, optionally, a liquid-vapour separator. The latter traps the fuel in a liquid phase. The fuel in the vapour phase only is fed into the canister via a tank port. The air/fuel vapour mixture first flows through a first adsorbent chamber comprising an adsorbent material and then through a second adsorbent chamber also comprising an adsorbent material. As the air/fuel vapour mixture flows through the first and second adsorbent chambers, the fuel component of the mixture is adsorbed by the adsorbent material and purified air exits the canister via an atmospheric port. During operation of the engine, air is drawn through the canister from the atmospheric port, through the second and first adsorbent chambers, and out via a purge port. As the air passes through the second and first adsorbent chambers the air desorbs the fuel component from the adsorbent material, whereby the latter is regenerated. The purge port is connected to the internal combustion engine, where the fuel component is then burnt.

Such evaporative canisters are however not designed to meet new, stricter regulations on fuel evaporating from vehicles.

SUMMARY OF THE INVENTION

The object of the present invention is hence to provide a more effective evaporated fuel processing device.

According to the invention, an evaporated fuel processing device is proposed, the device comprising a tank port and an atmospheric port; a first adsorbent chamber between the tank port and the atmospheric port, and a second absorbent chamber between the first adsorbent chamber and the atmospheric port, the first and second adsorbent chambers being filled with an adsorbent material. According to an important aspect of the invention, at least two elongate flow passages are arranged in parallel between the first adsorbent chamber and the second adsorbent chamber. The at least two elongate flow passages provide a better flow distribution of the vapour through the evaporated fuel processing device. Due to the longer flow passages—as compared to the short passages, i.e. via the compensator chamber, of the prior art devices—the time needed for the air/fuel vapour mixture to flow from the first adsorbent chamber to the second adsorbent chamber is increased. The vapour mixture is thereby homogenised and a better balance of vapour front reaching the second adsorbent chamber is achieved. The efficiency of the evaporated fuel processing device can hence be increased. Alternatively, the volume and/or quality of the adsorbent material can be reduced without losing on efficiency, whereby costs can be saved while maintaining the efficiency of the device.

Preferably, the elongate flow passages are substantially free from adsorbent material. The flow of air/fuel vapour mixture through the elongate flow passages is hence not unduly restricted. The flow distribution, and hence the efficiency of the device, is increased.

The elongate flow passages can extend substantially parallel to the flow of air/fuel vapour mixture through the first adsorbent chamber.

Preferably, a first elongate flow passage has a first cross-section and a second elongate flow passage has a second cross-section, the first cross-section being different from the second cross-section. The different cross-sections allow a faster flow of air/fuel vapour mixture through the flow passage of larger cross-section and an aspiration effect in the flow passage of smaller cross-section. This leads to a better evacuation of the vapour mixture from the first adsorbent chamber and to a better cooling of the vapour mixture. The efficiency of the evaporated fuel processing device is thereby improved.

The evaporated fuel processing device advantageously further comprises a third adsorbent chamber between the second adsorbent chamber and the atmospheric port, the third adsorbent chamber being filled with an adsorbent material. The third adsorbent chamber allows reducing bleed emissions by adsorbing any remaining fuel component before the vapour escapes into the atmosphere via the atmospheric port.

Advantageously, the third adsorbent chamber has a length of between 40 and 80 mm and a diameter of between 30 and 60 mm. Preferably, the length is between 50 and 70 mm and the diameter is between 42 and 50 mm. Third adsorbent chambers of the prior art devices, to reduce bleed emissions, are often filled with a special kind of activated carbon, designed to reduce flow restriction. Such a special kind of activated carbon is however very expensive. A third adsorbent chamber of dimensions specified above, can be filled with normal activated carbon while still maintaining sufficiently low flow restriction. There is no need to use the expensive special kind activated carbon and cheaper normal activated carbon can instead be used.

The first, second and third adsorbent chambers are preferably integrated within a single evaporative canister. A more compact design can thereby be achieved. It is however not excluded to provide a main evaporative canister comprising the first and second adsorbent chambers and to provide the third adsorbent chamber as an auxiliary evaporative canister downstream of the main evaporative canister.

The first and/or second and/or third adsorbent chambers and/or the elongate flow passages can have rounded cross-sections, so that a more compact arrangement of flow passages can be obtained. Also, the rounded adsorbent chambers allow a more efficient use of adsorbent material arranged therein. Indeed, only a limited amount of vapour mixture flows through the corners of a rectangular adsorbent chamber so that the adsorbent material in the corners is not efficiently used.

The adsorbent material preferably comprises activated carbon.

The evaporated fuel processing device advantageously comprises a purge port connected to the first adsorbent chamber, so that fresh air can be drawn from the atmospheric port through the adsorbent chambers to the purge port. By drawing fresh air through the adsorbent chambers, the drawn air desorbs the fuel components from the adsorbent material, i.e. fuel components can be stripped off the adsorbent material trapped therein. The adsorbent material can thereby be regenerated during engine operation.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
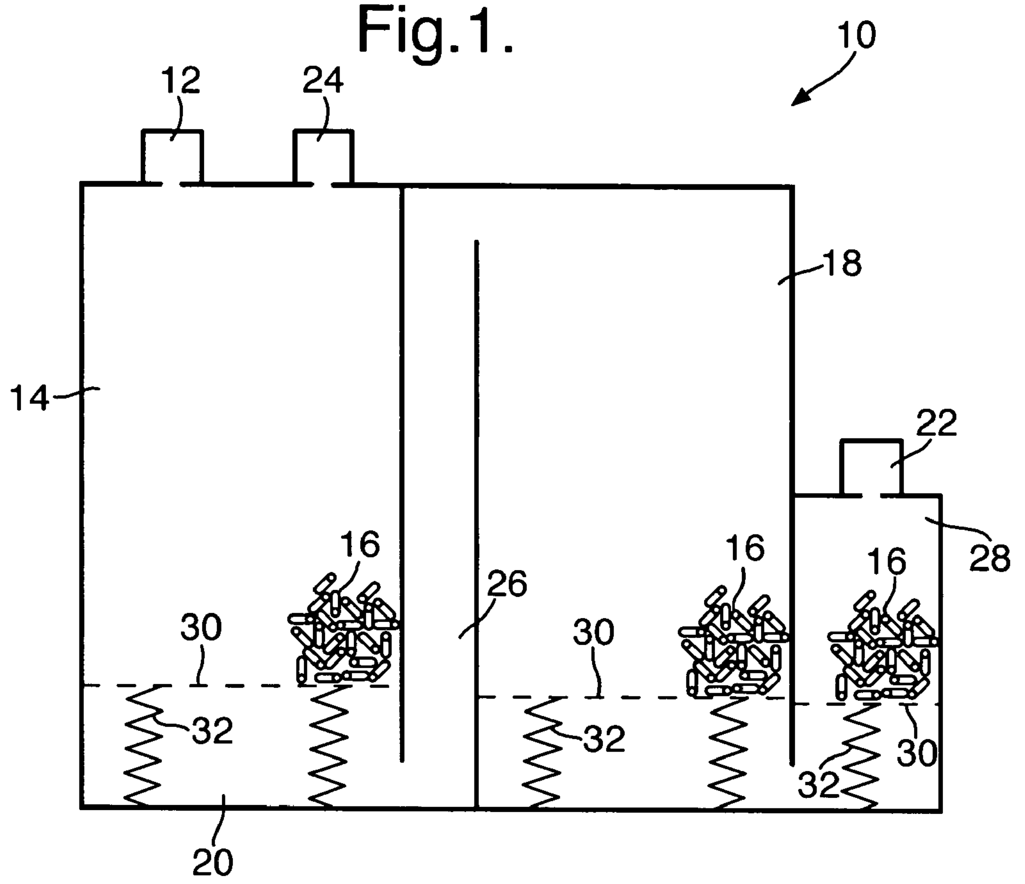
FIG. 1 is a schematic lateral section view through an evaporated fuel processing device according to the invention.

A preferred embodiment of an evaporative canister according to the invention is shown in FIG. 1. The evaporative canister shown in this embodiment is a vertical-placed type integrated canister 10 connected to a fuel tank (not shown). Evaporated fuel from the fuel tank is led to the evaporative canister 10 via an evaporated fuel passage and, optionally, a liquid-vapour separator (not shown). The latter traps the fuel in a liquid phase. The fuel in the vapour phase only is fed into the canister via a tank port 12. The air/fuel vapour mixture first flows through a first adsorbent chamber 14 comprising an adsorbent material 16, generally activated carbon, and then through a second adsorbent chamber 18 also comprising an adsorbent material 16. As the air/fuel vapour mixture flows through the first and second adsorbent chambers 14, 18, the fuel component of the air/fuel vapour mixture is stripped from the vapour mixture and purified air exits the canister 10 into atmosphere via an atmospheric port 22. During operation of the engine, air can be drawn through the canister 10 from the atmospheric port 22, through the second and first adsorbent chambers 18, 14, and out via a purge port 24. As the air passes through the second and first adsorbent chambers 18, 14, the air desorbs the fuel component from the adsorbent material 16, whereby the latter is regenerated. The purge port 24 is connected to a combustion chamber of an internal combustion engine (not shown), where the fuel component is then burnt.

According to an important aspect of the invention, the evaporative canister 10 is provided with at least two elongate flow passages 26, 26' (only one of which can be seen on FIG. 1) arranged in parallel between the first adsorbent chamber 14 and the second adsorbent chamber 18.

The elongated flow passages 26, 26' are considerably longer than the flow passages of the prior art devices, wherein the flow passages are formed by the compensator chamber 20. Due to the elongate flow passages 26, 26', the air/fuel vapour mixture exiting the first adsorbent chamber 14 must flow through the elongate flow passages 26, 26', along substantially the whole length of the first adsorbent chamber 14 to reach the second adsorbent chamber 18. Due to the longer flow passages the time needed for the air/fuel vapour mixture to flow from the first adsorbent chamber 14 to the second adsorbent chamber 18 is increased. The vapour mixture is thereby homogenised and a better balance of vapour front reaching the second adsorbent chamber 18 is achieved. A better flow distribution of the vapour mixture through the evaporated fuel processing device is hence increased. Alternatively, the volume and/or quality of the adsorbent material can be reduced without losing on efficiency, whereby costs can be saved. The elongate flow passages 26, 26' are substantially free from adsorbent material 16, so that the flow of air/fuel vapour mixture through the elongate flow passages 26, 26' is not unduly restricted. The "empty" elongate flow passages 26, 26' also increase homogenisation of the vapour mixture in the passages.

In order to reduce bleed emissions, a third adsorbent chamber 28 is arranged between the second adsorbent chamber 18 and the atmospheric port 22. The third adsorbent chamber 28 is also filled with adsorbent material 16 and adsorbs any remaining fuel component from the vapour mixture exiting the second adsorbent chamber 18 before the vapour escapes into the atmosphere via the atmospheric port. The third adsorbent chamber 28 is preferably between 50 and 70 mm in length and between 42 and 50 mm in diameter. A third adsorbent chamber 28 of such dimensions can be filled with normal activated carbon while maintaining sufficiently low flow restriction. There is no need to use an expensive special kind activated carbon as in some prior art devices.

Integrating the first, second and third adsorbent chambers 14, 18, 28 in a single evaporative canister, can achieve a compact design of evaporated fuel processing device 10.

It is further to be noted that it is desirable to compact the adsorbent material 16 in the adsorbent chambers 14, 18, 28 in order to efficiently adsorb fuel components. The adsorbent material 16 is therefore maintained in a compact state by means of adsorbent holding filters 30 and adsorbent holding springs 32 associated therewith.

Figure 2:
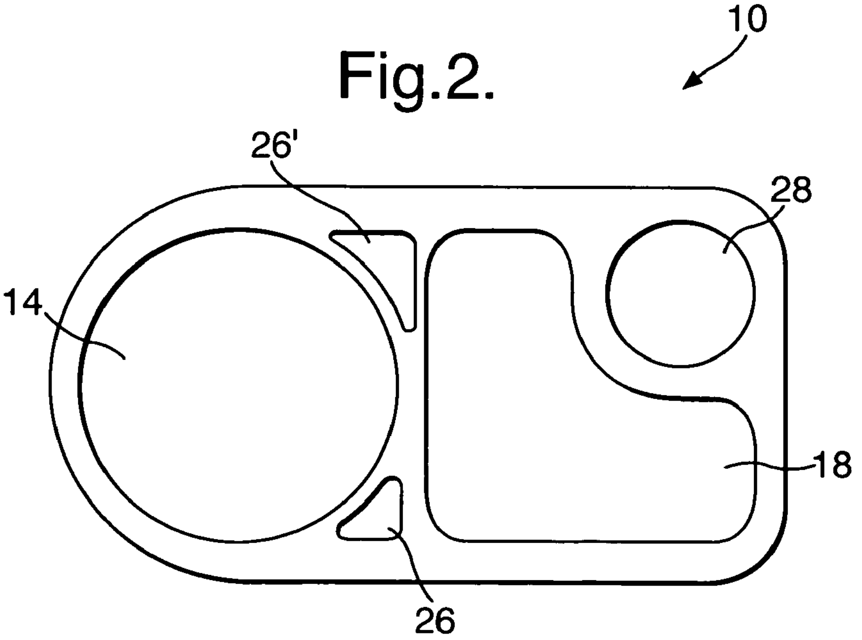
FIG. 2 is a top section view through the evaporative fuel processing device of FIG. 1.

Further features of the device can be better described by referring to FIG. 2, which is a schematic section view from above through the evaporated fuel processing device 10.

Both the first and second elongate flow passages 26, 26' can be seen in this Figure. It can also be seen that the first and third adsorbent chambers 14, 28 have circular cross-section and that the second adsorbent chamber 18 and the elongate flow passages 26, 26' have rounded cross-section. The elongate flow passages 26, 26' tightly fit in a space between the first and second adsorbent chambers 14, 18. A compact arrangement of the evaporated fuel processing device 10 is achieved. Also, the rounded adsorbent chambers 14, 18, 28 allow a more efficient use of the adsorbent material 16 arranged therein.

The first and second elongate flow passages 26, 26' have different cross-section so as the allow a faster flow of air/fuel vapour mixture through the second flow passage 26' of larger cross-section and an aspiration effect in the first flow passage 26 of smaller cross-section. This leads to a better evacuation of the vapour mixture from the first adsorbent chamber 14 and to a better cooling of the vapour mixture in the elongate flow passages 26, 26'. The efficiency of the device is thereby improved.

It is finally to be noted that, although the above description describes a vertical-placed type integrated canister, a horizontal-placed type integrated canister is not excluded.

The invention claimed is:

1. An evaporated fuel processing device for an internal combustion engine of an automotive vehicle, comprising:

a canister defining a first adsorbent chamber and a second adsorbent chamber and comprising a wall separating the first adsorbent chamber and the second adsorbent chamber;

said first adsorbent chamber containing an adsorbent material and comprising an upper portion having a tank port for connection to a fuel tank and a lower portion, said second adsorbent chamber containing an adsorbent material and comprising an upper portion and a lower portion communicating with an atmospheric port;

said wall comprising at least two elongate flow passages, each said elongate flow passage communicating at one end with the lower portion of the first adsorbent chamber and communicating at another end with the upper portion of the second adsorbent chambers, whereby said elongate flow passages are spaced apart in said wall and provide parallel flow paths between the first adsorbent chamber and the second adsorbent chamber.

2. An evaporated fuel processing device according to claim 1, wherein said elongate flow passages are substantially free from adsorbent material.

3. An evaporated fuel processing device according to claim 1, wherein said elongate flow passages extend substantially parallel to the flow of air/fuel vapour mixture through said first adsorbent chamber.

4. An evaporated fuel processing device according to claim 1, wherein a first elongate flow passage has a first cross-section and a second elongate flow passage has a second cross-section, said first cross-section being different from said second cross-section.

5. An evaporated fuel processing device according to claim 1, further comprising a third adsorbent chamber between said second adsorbent chamber and said atmospheric port, said third adsorbent chamber being filled with an adsorbent material.

6. An evaporated fuel processing device according to claim 5, wherein said third adsorbent chamber has a length between 40 and 80 mm and a diameter of between 30 and 60 mm.

7. An evaporated fuel processing device according to claim 5, wherein said first, second and third adsorbent chambers are integrated within a single evaporative canister.

8. An evaporated fuel processing device according to claim 5, wherein said first and/or second and/or third adsorbent chambers and/or said elongate flow passages have rounded cross-section.

9. An evaporated fuel processing device according to claim 1, wherein said adsorbent material comprises activated carbon.

10. An evaporated fuel processing device according to claim 1, further comprising a purge port connected to said first adsorbent chamber.

11. An evaporated fuel processing device according to claim 5, wherein said third adsorbent chamber has a length between 50 and 70 mm, and a diameter of between 42 and 50 mm.

* * * * *